United States Patent [19]

Nakamura

[11] Patent Number: 5,682,531
[45] Date of Patent: Oct. 28, 1997

[54] CENTRAL PROCESSING UNIT

[75] Inventor: Kazuo Nakamura, Itami, Japan

[73] Assignee: Mitsubishi Denki Kabushiki Kaisha, Tokyo, Japan

[21] Appl. No.: 529,897

[22] Filed: Sep. 18, 1995

[30] Foreign Application Priority Data

Sep. 26, 1994 [JP] Japan .................................. 6-229619

[51] Int. Cl.⁶ .................................................. G06F 9/46
[52] U.S. Cl. ...................... 395/678; 395/569; 395/733; 364/281.3; 364/281.4; 364/281.7
[58] Field of Search .................................. 395/678, 677, 395/569, 733; 364/281.3, 281.4, 281.7

[56] References Cited

U.S. PATENT DOCUMENTS 5,142,677  8/1992  Ehlig et al. .............................. 395/678

Primary Examiner—Kevin A. Kriess
Assistant Examiner—Majid A. Banankhah
Attorney, Agent, or Firm—Lowe, Price, LeBlanc & Becker

[57] ABSTRACT

An instruction code includes a first memory address part 22 and a second memory address part 23, and when a micro-instruction decoder 14 decodes an operation code of save or restore instruction of the instruction code prefetched by an instruction queue 13, a micro-ROM 15 assigns the task number specified by the first memory address part 22 to an index value, reads a register list of the task from a context save information specified by the second memory address part 23, and selectively saves or restores the content of the register specified by the register list. With this configuration, the central processing unit can save or restore the context with a small occupied memory quantity and at high speed.

3 Claims, 16 Drawing Sheets

(ONE BYTE FOR EACH AREA)

(ONE BYTE FOR EACH AREA)

FIG. 5
PRIOR ART

```
1st LINE    MOVL     R0,@#TMP2
2nd LINE    MOVZWL   @#TASKNUM,R0
3rd LINE    MOVW     @#RLTBL[R0],@#TMP1
4th LINE    MOVL     @#TMP2,R0
5th LINE    SUBL     SP,#8
6th LINE    PUSHR    @#TMP1
```

FIG. 7

| L7 | L6 | L5 | L4 | L3 | L2 | L1 | L0 | P2 | P1 | P0 | REMZ |
|----|----|----|----|----|----|----|----|----|----|----|------|
| X | X | X | X | X | X | X | 1 | 0 | 0 | 0 | 0 |
| X | X | X | X | X | X | 1 | 0 | 0 | 0 | 1 | 0 |
| X | X | X | X | X | 1 | 0 | 0 | 0 | 1 | 0 | 0 |
| X | X | X | X | 1 | 0 | 0 | 0 | 0 | 1 | 1 | 0 |
| X | X | X | 1 | 0 | 0 | 0 | 0 | 1 | 0 | 0 | 0 |
| X | X | 1 | 0 | 0 | 0 | 0 | 0 | 1 | 0 | 1 | 0 |
| X | 1 | 0 | 0 | 0 | 0 | 0 | 0 | 1 | 1 | 0 | 0 |
| 1 | 0 | 0 | 0 | 0 | 0 | 0 | 0 | 1 | 1 | 1 | 0 |
| 0 | 0 | 0 | 0 | 0 | 0 | 0 | 0 | 1 | 1 | 1 | 1 |

X: IRRELEVANT

FIG. 11A

| 1st STEP | ・WRITE 1st MEMORY ADDRESS PART INTO MEMORY ADD. REG. |
|---|---|
| 2nd STEP | ・READ CONTENT OF ADD. OF MEMORY SPECIFIED BY MEMORY ADD. REG. INTO MEMORY DATA REG. |
| 3rd STEP | ・DOUBLE CONTENT OF MEMORY DATA REG., AND WRITE RESULT INTO TEMPORARY REG. |
| 4th STEP | ・ADD 2nd MEMORY ADD. PART AND CONTENT OF TEMPORARY REG., AND WRITE RESULT INTO TEMPORARY REG. AND MEMORY ADD. REG. |
| 5th STEP | ・READ CONTENT OF ADD. OF MEMORY SPECIFIED BY MEMORY ADD. REG. INTO MEMORY DATA REG. |
| 6th STEP | ・WRITE CONTENT OF MEMORY DATA REG. INTO REG. LIST REG. |
| 7th STEP | ・ADD "1" TO CONTENT OF TEMPORARY REG., AND WRITE RESULT INTO MEMORY ADD. REG. |
| 8th STEP | ・READ CONTENT OF ADD. OF MEMORY SPECIFIED BY MEMORY ADD. REG. INTO MEMORY DATA REG. |
| 9th STEP | ・SUBTRACT CONTENT OF MEMORY DATA REG. FROM STACK POINTER, AND WRITE RESULT INTO STACK POINTER<br>・WHEN ALL BIT OF REG. LIST REG. ARE "0", JUMP TO 13th STEP |
| 10th STEP | ・SUBTRACT "1" FROM STACK POINTER, AND WRITE RESULT INTO MEMORY ADD. REG.<br>・WRITE OUTPUT OF PRIORITY ENCODER INTO REG. POINTER REG. |

FIG. 11B

| 11th STEP | ·WRITE CONTENT OF REG. SPECIFIED BY REG. POINTER REG. INTO MEMORY DATA REG.<br>·INCREMENT MEMORY ADD. REG. BY "1"<br>·CLEAR BIT OF NUMBER OF REG. LIST REG. SPECIFIED BY REG. POINTER REG. |
|---|---|
| 12th STEP | ·WRITE CONTENT OF MEMORY DATA REG. INTO ADD. OF MEMORY SPECIFIED BY MEMORY ADD. REG.<br>·WRITE OUTPUT OF PRIORITY ENCODER INTO REG. POINTER REG.<br>·WHEN AT LEAST ONE BIT OF REG. LIST REG. IS "1", JUMP TO 11th STEP |
| 13th STEP | ·FETCH OP CODE PART OF NEXT INSTRUCTION FROM INSTRUCTION QUEUE INTO INSTRUCTION DECODER<br>·FINISH INSTRUCTION |

FIG. 13A

| 1st STEP | • WRITE 1st MEMORY ADDRESS PART INTO MEMORY ADD. REG. |
|---|---|
| 2nd STEP | • READ CONTENT OF ADD. OF MEMORY SPECIFIED BY MEMORY ADD. REG. INTO MEMORY DATA REG. |
| 3rd STEP | • DOUBLE CONTENT OF MEMORY DATA REG. , AND WRITE RESULT INTO TEMPORARY REG. |
| 4th STEP | • ADD 2nd MEMORY ADD. PART AND CONTENT OF TEMPORARY REG. , AND WRITE RESULT INTO TEMPORARY REG. AND MEMORY ADD. REG. |
| 5th STEP | • READ CONTENT OF ADD. OF MEMORY SPECIFIED BY MEMORY ADD. REG. INTO MEMORY DATA REG. |
| 6th STEP | • WRITE CONTENT OF MEMORY DATA REG. INTO REG. LIST REG. |
| 7th STEP | • ADD "1" TO CONTENT OF TEMPORARY REG. , AND WRITE RESULT INTO MEMORY ADD. REG. |
| 8th STEP | • READ CONTENT OF ADD. OF MEMORY SPECIFIED BY MEMORY ADD. REG. INTO MEMORY DATA REG. |
| 9th STEP | • WRITE CONTENT OF STACK POINTER INTO MEMORY ADD. REG. |
| 10th STEP | • ADD CONTENT OF MEMORY DATA REG. TO STACK POINTER , AND WRITE RESULT INTO STACK POINTER<br>• WRITE OUTPUT OF PRIORITY ENCODER INTO REG. POINTER REG.<br>• WHEN ALL BIT OF REG. LIST REG. ARE "0", JUMP TO 13th STEP |

FIG. 13B

| 11th STEP | · READ CONTENT OF ADD. OF MEMORY SPECIFIED BY MEMORY ADD. REG. INTO MEMORY DATA REG.<br>· CLEAR BIT OF NUMBER OF REG. LIST REG. SPECIFIED BY REG. POINTER REG. |
|---|---|
| 12th STEP | · WRITE CONTENT OF MEMORY DATA REG. INTO ANY ONE OF R0 TO R7 SPECIFIED BY REG. POINTER REG.<br>· INCREMENT MEMORY ADD. REG. BY "1"<br>· WRITE OUTPUT OF PRIORITY ENCODER INTO REG. POINTER REG.<br>· WHEN AT LEAST ONE BIT OF REG. LIST REG. IS "1", JUMP TO 11th STEP |
| 13th STEP | · FETCH OP CODE PART OF NEXT INSTRUCTION FROM INSTRUCTION QUEUE INTO INSTRUCTION DECODER<br>· FINISH INSTRUCTION |

CENTRAL PROCESSING UNIT

BACKGROUND OF THE INVENTION

1. Field of the Invention

The invention relates to a central processing unit (CPU) of a computer, and more specifically, to a central processing unit which can save and restore the context at high speed.

2. Description of the Prior Art

When a computer executes multitasks, the processing called context switching is required. This context switching is specifically the processing in which, for example, when two tasks, task A and task B, are executed, the content (context) of general-purpose registers related to the task A within a central processing unit is temporarily saved in memory, while the context of task B that has been saved in memory is restored for execution.

For example, in the central processing unit having eight general-purpose registers R0–R7, when the data of task A in each general-purpose register is saved in memory, the context save area (including 2-byte reserved area) corresponding to registers R0–R7 is secured in the external memory as shown in FIG. 1. In such a central processing unit, even when the task A uses only a part of the registers among eight registers R0–R7, the data of all registers R0–R7 is saved in the save area of external memory. Consequently, in the case where each of registers R0–R7 is, for example, all 8 bits and when the registers used by the task A are only R1, R3, R4 and R6, in actuality, a 10-byte save area is required as shown in FIG. 1, though a save area of a total of 6 bytes is enough including 2-byte reserved area as shown in FIG. 2.

As an example of computer which is so configured as to selectively save only the registers actually used by the task, there are VAX-11 Series manufactured by DEC (Digital Equipment Corp.). In the VAX-11 Series, a total of 16 registers R0–R15 are prepared, and each one of the registers consists of 32 bits. However, R15 is provided for a program counter and R14 for a stack pointer.

FIG. 3 is a schematic diagram showing a register list, having 16-bit configuration, for specifying a register to be saved. Bit 0 to Bit 15 of the register list correspond to registers R0 to R15, and depending on the fact whether the bit is either "0" or "1", whether the corresponding register should be saved or not is specified. For example, when the value of each bit of the register list is "0000 0000 0101 1010 (binary)", since bit 1, bit 3, bit 4 and bit 6 are "1", only the context of registers R1, R3, R4 and R6 only are saved.

FIG. 4 is a schematic diagram showing the content of the context information table stored in memory when execution is switched between tasks in VAX-11 Series. For example, when switching is carried out between task 0 and task N (N is an integer), a specific register list is selected in correspondence with each task in the table of FIG. 4 (FIG. 4 shows up to task 3) as well as the task number is referred to as an index for identifying the task to be saved.

A save instruction of a register by the register list in FIG. 3 carries out specification of a register list in the general addressing mode. Consequently, when the task number is used as an index, the task number must temporarily be loaded to a register. FIG. 5 shows a program for saving the context of the register which is used by the task to be saved in VAX-11 Series, and the program is described in the assembly language. In the program of FIG. 5, one word of the memory corresponds to 16 bits. Now, description will be made on the saving operation of the apparatus operating on the program shown in FIG. 5.

Now, it is assumed that in the table shown in FIG. 4, task 2 is specified for the task number and in the task 2 register list, "0000 0000 0101 1010 (binary)" is set.

(First line): the content of register R0 is temporarily saved to memory address "TMP2".

(Second line): the task number in memory address "TASKNUM" is extended to 32 bits and loaded to the saved register R0.

(Third line): in the context saving information table of memory address "RTLBL", referring to task number 2 loaded to register R0, the task 2 register list is copied on the memory address "TMP1". In actuality, "RLTBL+2×2" (because in VAX-11 Series, 8 bits are assigned for one address, the value of 16 bits has to be doubled) is calculated and the task 2 register list in address "RLTBL+4" is specified and copied.

(Fourth line): the content saved in address "TMP2" in the first line is restored to register R0.

(Fifth line): in order to secure the reserved area for four registers, "16" is subtracted from the stack pointer (SP).

(Sixth line): of register R0–R15, the content of the registers specified by the task 2 register list copied in the area of the address "TMP1" in the third line is saved in the stack.

In the VAX-11 Series, because one register is 32 bits, that is, 4 bytes, the subtraction value is not "4" but "16".

As a result, in the stack area of the memory, as shown in of FIG. 2, only registers R1, R3, R4 and R6 are saved, which are specified by the register list.

As described above, to save the context by a conventional central processing unit of the computer, it is necessary to save or restore the register contents which are not necessary to be saved when there is no instruction to select optional register from a plurality of registers so as to save or restore the content, giving a rise to a problem in that the memory (RAM) must be extra occupied for this save area. In addition, there is another problem that extra time is required to save or restore the unnecessary register contents, which is wasteful.

In the computer such as VAX-11 Series which is so configured as to selectively save or restore only the necessary register contents, since it is necessary to refer the task number before saving the context, the task number must temporarily be moved from the memory to the register. For this reason, it is necessary to save and restore the task number between the register and the memory in which the task number is temporarily held, giving rise to a problem in that the time required for this processing becomes wasteful.

SUMMARY OF THE INVENTION

This invention has been devised to solve the above-mentioned problems, and it is the main object of this invention to provide a central processing unit which has a memory area for saving the context reduced and can markedly shorten the execution time required for context switching.

The central processing unit according to this invention restores the context of a task saved in the external memory and is provided with a plurality of internal registers, and controlling means for saving or restoring the context by selecting one or more registers from a plurality of the internal registers on the basis of one instruction code and transferring to or from the external memory. And the instruction code has a first address information indicating an address of the external memory wherein a task information specifying the task whose context must be saved or restored is stored, and a second address information indicating an address of the external memory wherein a context saving information including a register select information for specifying one or more registers among a plurality of internal registers to be saved or restored with respect to each of a plurality of tasks is stored.

In the central processing unit according to this invention, controlling means reads the task information from the external memory in accordance with the first address information, reads the register select information related to the task from the external memory in accordance with the second address information and the task information having been read, selects one or a plurality of registers from a plurality of the internal registers in accordance with the register select information having been read, and transfers the context between the selected register and the external memory so that the context is saved or restored. Consequently, the memory capacity required for saving and restoring the context can be kept small as well as the processing speed can be increased.

The above and further objects and features of the invention will more fully be apparent from the following detailed description with accompanying drawings.

BRIEF DESCRIPTION OF THE DRAWINGS

FIG. 5 is a schematic diagram showing a program example of the context save instruction of a central processing unit according to the another prior art;

FIG. 7 is a schematic diagram showing a truth table of a priority encoder of one embodiment of a central processing unit according to the invention;

FIGS. 11A and 11B are schematic diagrams showing a microprogram of a save instruction of one embodiment of a central processing unit according to this invention;

FIGS. 13A and 13B are schematic diagrams showing a microprogram of a restore instruction of one embodiment of a central processing unit according to the invention.

DESCRIPTION OF THE PREFERRED EMBODIMENTS

Figure 1:
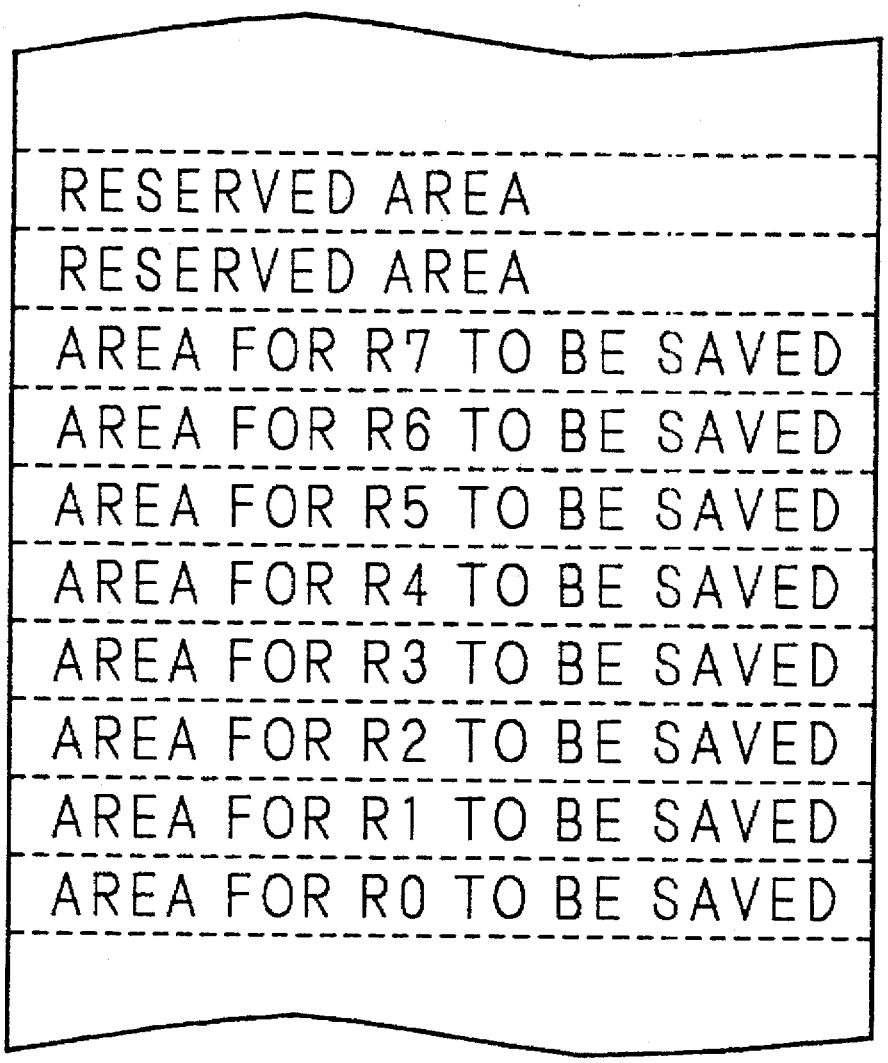
FIG. 1 is a schematic diagram of a memory area showing a context save area of a central processing unit according to a prior art.
Figure 2:
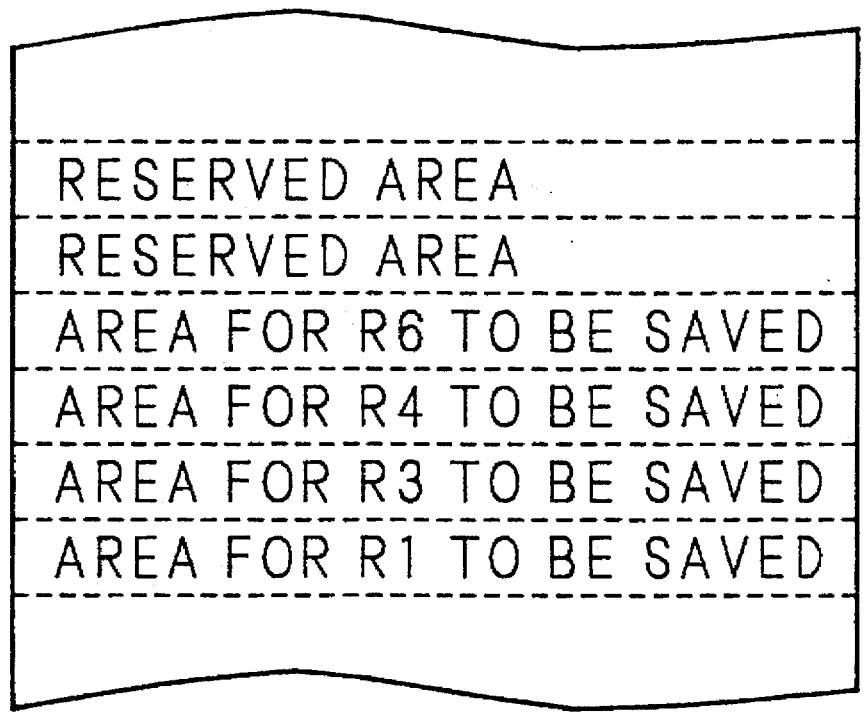
FIG. 2 is a schematic diagram of a memory area showing the context save area of a central processing unit according to another prior art.
Figure 3:
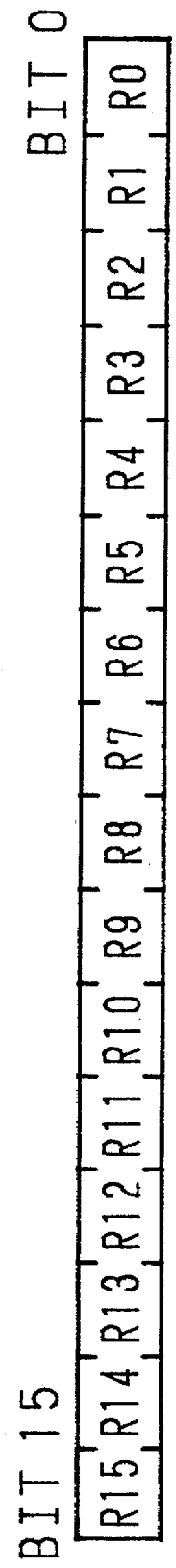
FIG. 3 is a schematic diagram showing a register list of a central processing unit according to the another prior art.
Figure 4:
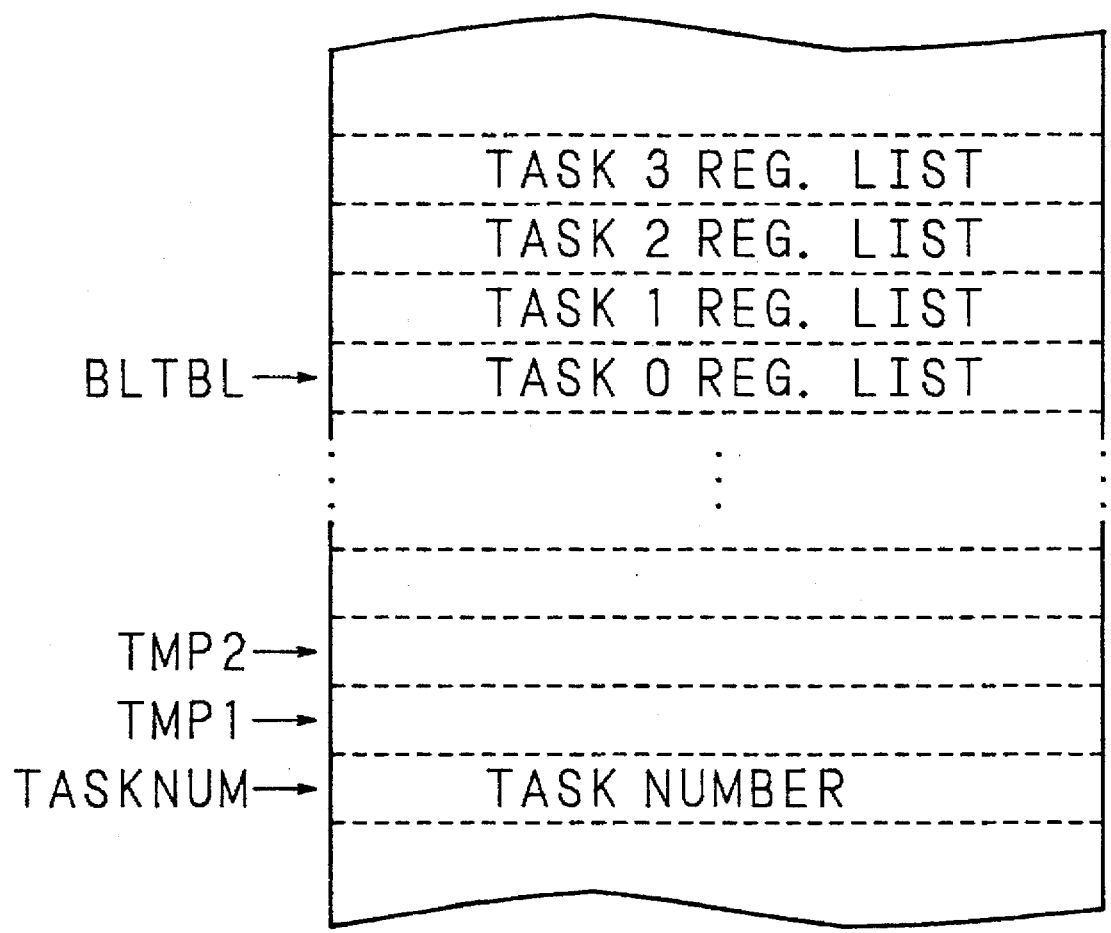
FIG. 4 is a schematic diagram of a memory area showing the context save information table of a central processing unit according to the another prior art.

This invention will be described in further detail referring to the drawings showing the embodiments thereof.

[First Embodiment]

Figure 6:
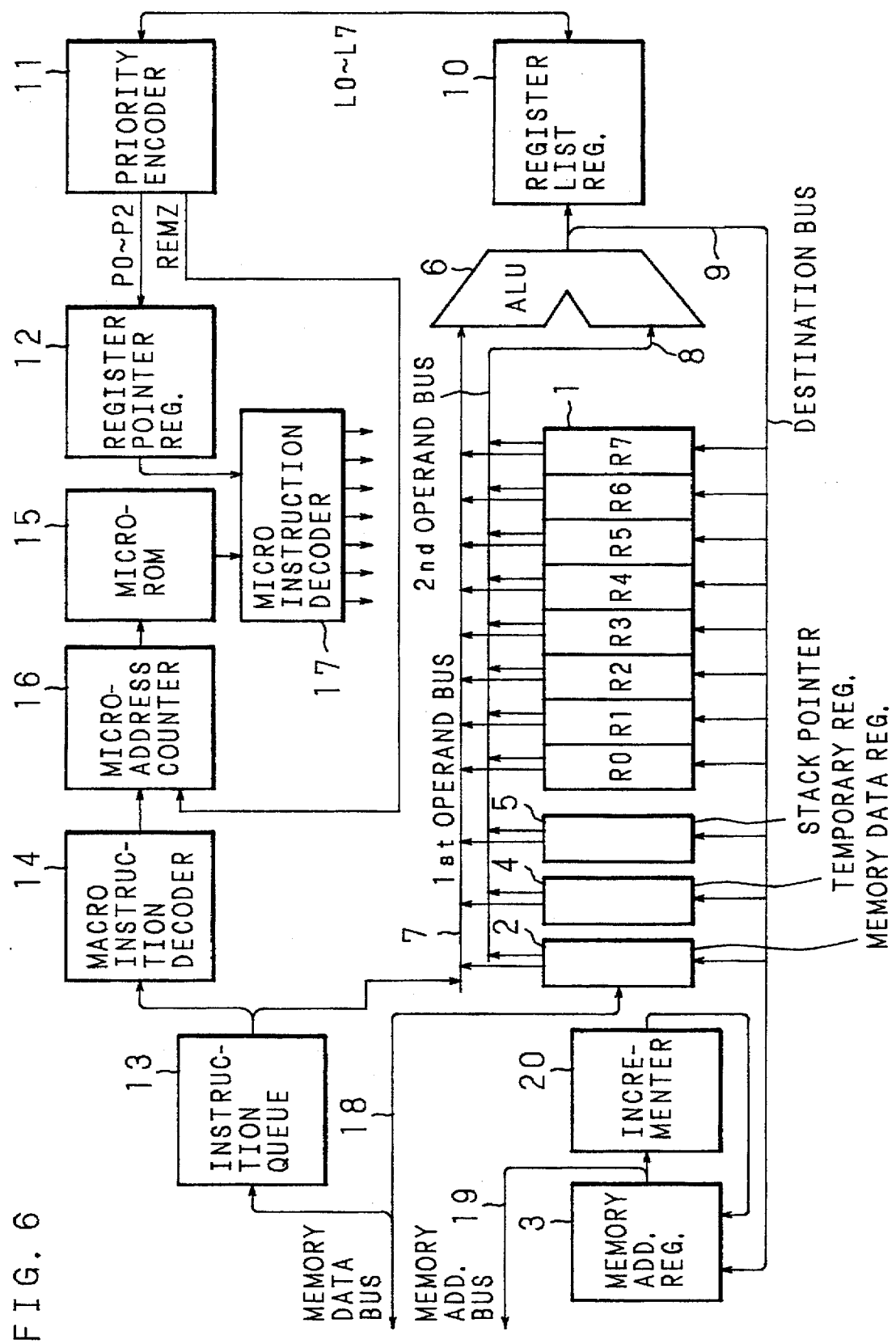
FIG. 6 is a block diagram showing a configuration example of one embodiment of a central processing unit according to the invention.

FIG. 6 is a block diagram showing one embodiment of a central processing unit of the present invention.

Numeral 1 indicates a register group, which comprises eight general-purpose registers from R0 to R7, each register having 8 bits, in this embodiment.

Numeral 2 indicates a memory data register, which temporarily holds data to be inputted or outputted between itself and the external memory or the register (both not illustrated).

Numeral 3 indicates a memory address register, which temporarily holds and outputs the address of the external memory or the register.

Numeral 4 indicates a temporary register, which temporarily holds various data at need.

Numeral 5 indicates a stack pointer, which specifies a stack (hold area) for saving or restoring the context.

Numeral 6 indicates an arithmetic and logic unit (hereinafter called "ALU"), which functions as operating means.

Numerals 7 and 8 indicate first and second operand buses, via which take operands from each of the registers R0–R7, memory data register 2, temporary register 4 and stack pointer 5 are transferred to the ALU 6. The ALU 6 carries out operation with respect to the contents (operands) outputted to each one of the first and second operand buses 7, 8.

Numeral 9 indicates a destination bus. Via this destination bus 9, the operation results of ALU 6 are written into any one of the registers R0–R7, memory data register 2, memory address register 3, temporary register 4 or stack pointer 5.

Numeral 10 indicates a register list register of 8-bit configuration, which holds a register list outputted from the ALU 6.

Numeral 11 indicates a priority encoder, which outputs signals with respect to 8-bit output from the register list register 10 in accordance with the truth table of FIG. 7 later described.

Numeral 12 indicates a register pointer register, which temporarily stores the output of the priority encoder 11.

Numeral 13 indicates an instruction queue, which stores macro instructions prefetched from the external memory (not illustrated) in accordance with the execution of instructions.

Numeral 14 indicates a macro instruction decoder which decodes macro instructions from the instruction queue 13.

Numeral 15 indicates a micro-ROM which stores microinstructions.

Numeral 16 indicates a microaddress counter, which specifies the address of the micro-ROM 15 in accordance with the decode results of the macro instruction decoder 14.

Numeral 17 indicates a microinstruction decoder, which decodes a microinstruction read from the micro-ROM 15 and controls operation of this whole central processing unit.

Numeral 18 indicates a memory data bus which inputs and outputs data are transferred between the memory data register and the external memory or registers.

Numeral 19 indicates a memory address bus via which the address in the memory address register is transferred to the external memory or registers.

Numeral 20 indicates an incrementer, which can increment the content of the memory address register 3 independently from the operation in the ALU 6.

Figure 8:
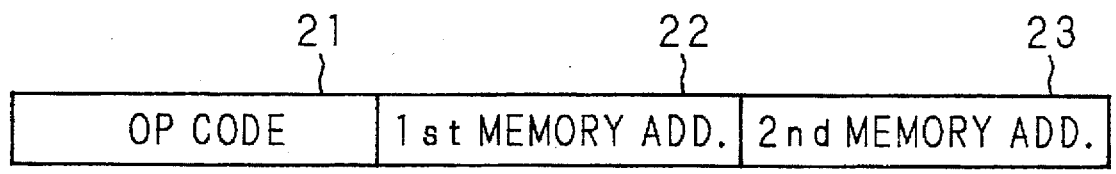
FIG. 8 is a schematic diagram showing instruction codes of save instructions, or restore instructions of one embodiment of a central processing unit according to the invention.

FIG. 8 is a schematic diagram showing the instruction codes of a save instruction and a restore instruction processed by the central processing unit of this invention.

In FIG. 8, numeral 21 is an operation code (OP code) part for identifying the kind of instruction, that is, whether it is a save instruction or restore instruction, numeral 22 the first memory address part for specifying the address (first memory address) of the memory in which the task number later discussed is stored, and numeral 23 the second memory address part for specifying the address (second memory address) of the save information table of the context later discussed.

Figure 9:
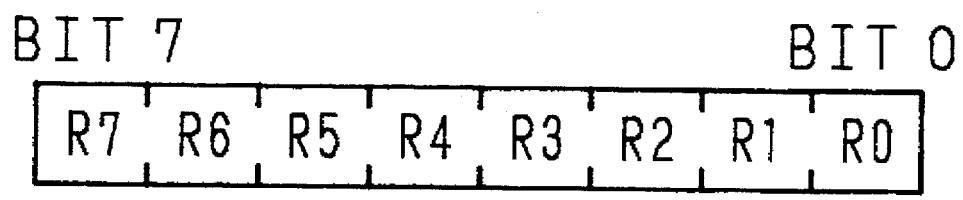
FIG. 9 is a schematic diagram showing a register list of one embodiment of a central processing unit according to the invention.

FIG. 9 is a schematic diagram showing the content of the register list of the central processing unit of this invention. In this embodiment, since the number of registers is 8, registers R0–R7, each bit of the 8-bit configuration register list specifies registers R0–R7 as shown in FIG. 9. In the same manner as in the case of a conventional example, since save is specified when the value of each bit is "1", "01011010 (binary)" is stored in the register list when the registers to be saved are R1, R3, R4 and R6.

Referring now to the case where the save or the restore instruction whose instruction codes are shown in FIG. 8 is executed, the operation of the central processing unit of this invention will be described.

[Operation at the Time of Executing Save Instruction]

At first, explanation will be given on the operation of the case where the save instruction is executed by the central processing unit of the invention. Here, as an example, explanation will be given on the case where task 2 which is a second task among N number of tasks (task 0 to task N−1) is saved.

Figure 10:
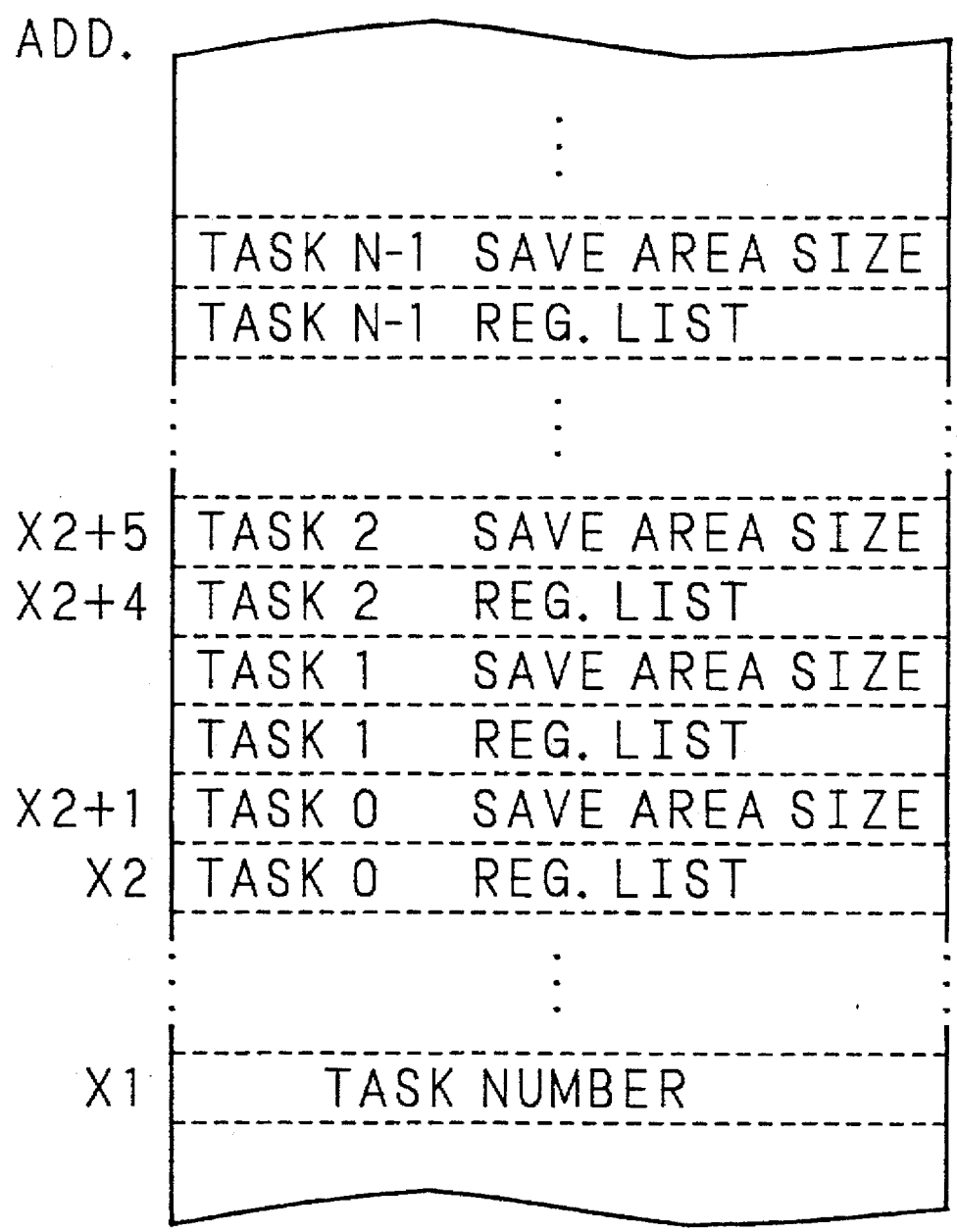
FIG. 10 is a schematic diagram of a memory area showing a context save information table of one embodiment of a central processing unit according to the invention.

FIG. 10 is a schematic diagram showing the contents of the context save information table in the memory. In the context save information table, the task number is stored in address X1 and from address X2, by increments of 2 addresses, the relevant task register list and the task save area size of 0th to "N−1"th task are stored in the value of 8 bits each (16 bits per one task).

Now it is assumed that the following values are stored for the task number of the address "X2+4", the task 2 register list, and the save information size of the address "X2+5".

Task number 2

Register list: 0101 1010 (binary)

Save information size: 6

FIGS. 11A and 11B are schematic diagrams for explaining the microprogram outputted from the micro-ROM 15 when the central processing unit of the invention executes the save instruction having the instruction code shown in FIG. 8.

(First step): First of all, prior to executing this save instruction, in the step of the last microinstruction for executing the instruction just before, the operation code part 21 of the save instruction is fetched from the instruction queue 13 to the macro instruction decoder 14. The macro instruction decoder 14 decodes the operation code part 21 of the instruction code and recognizes that the instruction is a save instruction. The address of the micro-ROM 15 in which the microinstruction of the first step of the microprogram shown in FIGS. 11A and 11B is stored is outputted to the microaddress counter 16. The microaddress counter 16 loads the address and outputs it to the micro-ROM 15. The micro-ROM 15 outputs the microinstruction of the first step stored in the address to the microinstruction decoder 17. The microinstruction decoder 17 decodes this and controls the central processing unit to enable the execution of the first step of FIGS. 11A and 11B. In this first step, the address "X1" written into the first memory address part 22 of the instruction code is taken from the instruction queue 13 and written into the memory address register 3 via the first operand bus 7, ALU 6, and destination bus 9. Simultaneously, the microaddress counter 16 increments its own value by "1".

(Second step): Micro ROM 15 receives the incremented address of this microaddress counter 16 and outputs the microinstruction of the second step to the microinstruction decoder 17. The microinstruction decoder 17 decodes this and reads the contents of the memory of the address "X1" specified by the memory address register 3, and issues read request to the external so that it is held in the memory data register 2 via the memory data bus 18. That is, in the memory data register 2, the task number stored in the context save information table shown in FIG. 10 is held. Similarly, the microaddress counter 16 increments its own value by "1". For the subsequent step and after, the microinstruction of each step is outputted from the micro-ROM 15 by the similar procedure as described above and the central processing unit is executed and controlled by this microinstruction.

(Third step): The value of the task number held in the memory data register 2 is inputted to the ALU 6 via the first operand bus 7 and is multiplied by "2". This multiplication result is temporarily written in the register 4 via the destination bus 9. Consequently, the value obtained by doubling the task number 2, that is "4", is temporarily written in the register 4.

(Fourth step): The second memory address part 23 of the instruction code is taken from the instruction queue 13 and outputted to the first operand bus 7. On the other hand, the content of the temporary register 4 is outputted to the second operand bus 8. The ALU 6 adds both and writes the result in both memory address register 3 and the temporary register 4. In this example, the value "X2+4", which is the sum of the address "X2" written in the second memory address part 23 of the instruction code and "4", being the value of operation result at the third step, is written.

(Fifth step): The memory content of the address specified by the memory address register 3 is read from the external memory and held in the memory data register 2 via the memory data bus 18. In this example, the task 2 register list of the address "X2+4" stored in the context save information table shown in FIG. 10 is read. That is, in this embodiment, in the memory data register 2, "0101 1010 (binary)" is held.

(Sixth step): The content stored in the memory data register 2, that is, the task 2 register list is written in the register list register 10 via the ALU 6 as well as inputted to the priority encoder 11.

FIG. 7 is a truth table of the priority encoder 11 as described above.

The priority encoder 11 inputs 8-bit outputs L0–L7 of the register list register 10 and outputs 3-bit encode value P0–P2 and a signal REMZ which indicates whether all the bits of outputs L0–L7 are "0" or not in accordance with the truth table shown in FIG. 7. For example, when the task 2 register list: "0101 1010 (binary)" is written in the register list register 10 at the 6th step, the output of the register list register 10 is inputted to the priority encoder 11 as (L7, L6, ..., L0)=(0, 1, 0, 1, 1, 0, 1, 0), and from the priority encoder 11, (P2, P1, P0)=(0, 0, 1) and REMZ=0 are outputted.

(Seventh step): To the content of the temporary register 4, "1" is added and the result is written in the memory address register 3. Consequently, "X2+4+1" is written in the memory address register 3.

(Eighth step): The content of the memory of the address "X2+5" specified by the memory address register 3 is read and held in the memory data register 2. That is, the task 2 save area size shown in FIG. 10 is read, and the value "6" of size is held in the memory register 2 here.

(Ninth step): From the value of the stack pointer 5 (for example, let it be Z) before executing the save instruction, the content "6" of the memory data register 3 is subtracted and the value of the stack pointer 5 is rewritten to "Z−6". At the same time, the REMZ output of the priority encoder 11 is inputted to the microaddress counter 16, and when the REMZ is "1", the 10th to 12th steps which are save processing of the register are jumped and the microaddress is loaded at 13th step later described. That is, when all of the bits of the register list register 10 are "0", processing jumps to the step 13. However, because there are bits which are not "0", the microaddress counter 16 increments its value by "1" and the next 10th step is executed.

(Tenth step): "1" is subtracted from the value "Z−6" of stack pointer 5, and the result is written into the memory address register 3. At the same time, the encode output of the priority encoder 11 is written into the register pointer register 12. In this step, since the content of the register list register 10 is "0101 1010", the priority encoder 11 outputs the encode value "1" ("001" in binary).

(Eleventh step): The register pointer register 12 outputs the inputted encode value to the microinstruction decoder 17. The microinstruction decoder 17 recognizes the register to be saved from registers R0–R7 by this encode value and writes the content of the register specified by the encode value to the memory data register 2. Since the encode value is "1" in this case, the register R1 is specified. Consequently, the content of the register R1 is written into the memory data register 2. At the same time, the incrementer 20 increments the memory address register 3 by "1". As a result, the value of the memory address register 3 becomes "Z−6" which is the value of the stack pointer before "1" is subtracted in the 10th step. In addition, in the register list stored in the register list register 10, the bit of the number corresponding to the register R1 specified by the register pointer register 17 (bit 1 in this example) is cleared. As a result, the value of the register list register 10 changes from "0101 1010 (binary)" to "0101 1000". Consequently, the priority encoder 11 outputs the encode value "3" ("011" in binary) in accordance with the truth table of FIG. 7.

(Twelfth step): The content of the memory data register 2 is written into the memory of the address specified by the memory address register 3. Here, the address "Z−6" is specified by the memory address register 3. At the same time, the encode value "3" of the priority encoder 11 is written into the register pointer register 12. In addition, when the REMZ output of the priority encoder 11 is "0", the microaddress counter 16 loads the microaddress of the 11th step and repeats 11th and 12th steps. When the REMZ value is "1", the microaddress of the 13th step is loaded to the microaddress counter 16.

In this embodiment, 11th and 12th steps are executed four times until all of the bits of the register list stored in the register list register 10 become "0". At this time, the memory address register 3 is incremented by "1" every time 11th and 12th steps are repeated.

By the foregoing processing, after 1st to 4th executions of the 11th step, the contents of the register list register 10 and register pointer register 12 and a register to be saved are determined as follows.

First execution
Register list register: 0101 1000
register pointer register: 1
Register to be saved: R1
Second execution
Register list register: 0101 0000
Register pointer register: 3
Register to be saved: R3
Third execution
Register list register: 0100 0000
Register pointer register: 4
Register to be saved: R4
Fourth execution
Register list register: 0000 0000
Register pointer register: 6
Register to be saved: R6

(Thirteenth step): When, in 12th or 9th step, the REMZ value of the priority encoder 11 becomes "1", that is, all of the bits of the register list register 10 become "0", the operation code part of the next instruction is fetched to the macro instruction decoder 14 from the instruction queue 13 and execution of the save instruction is completed.

As a result of the foregoing, in the memory, the contents of four registers R1, R3, R4 and R6 of registers R0–R7 are saved.

Figure 12:
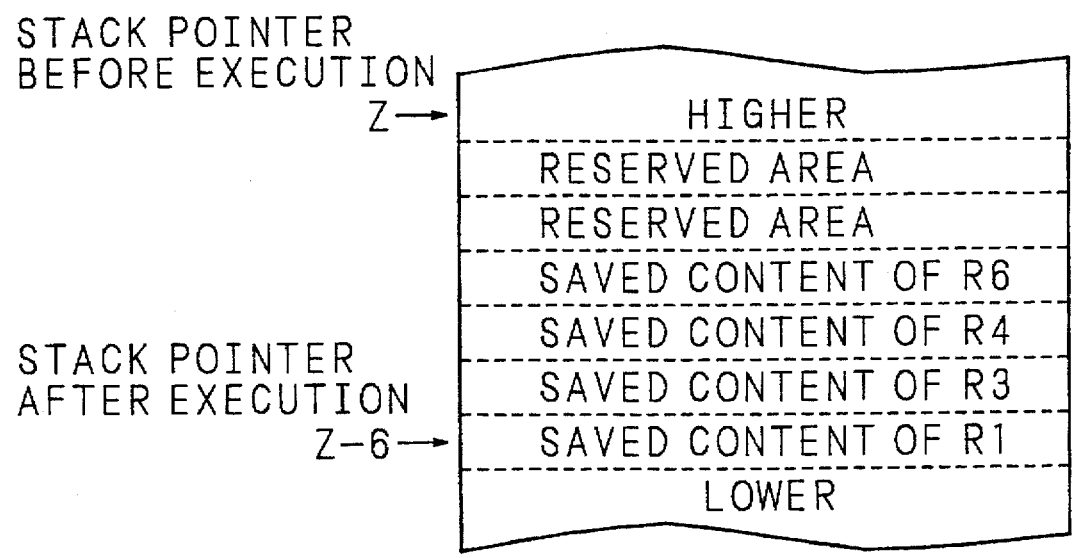
FIG. 12 is a schematic diagram of a memory area showing a context save area of one embodiment of a central processing unit according to the invention.

FIG. 12 is schematic diagram showing a save area prepared in the memory.

At the moment right before the 9th step is executed, the stack pointer points out the memory address "Z" and after the execution of the 9th step, it points the address "Z−6" obtained by subtracting the value "6" of the task 2 save area size. In the 11th step, the memory address register 3 is incremented by "1" and the save areas of registers R1, R3, R4, R6 are specified successively from the address "Z−6", and to these save areas the register contents are saved.

[Operation at the Time of Executing Restore Instruction]

Now, description will be made on the operation when the restore instruction is executed in the central processing unit of the present invention.

FIGS. 13A and 13B are schematic diagrams explaining the microprogram outputted from the micro-ROM 15 when the central processing unit of the present invention executes the restore instruction which has the instruction code shown in FIG. 8.

Figure 14:
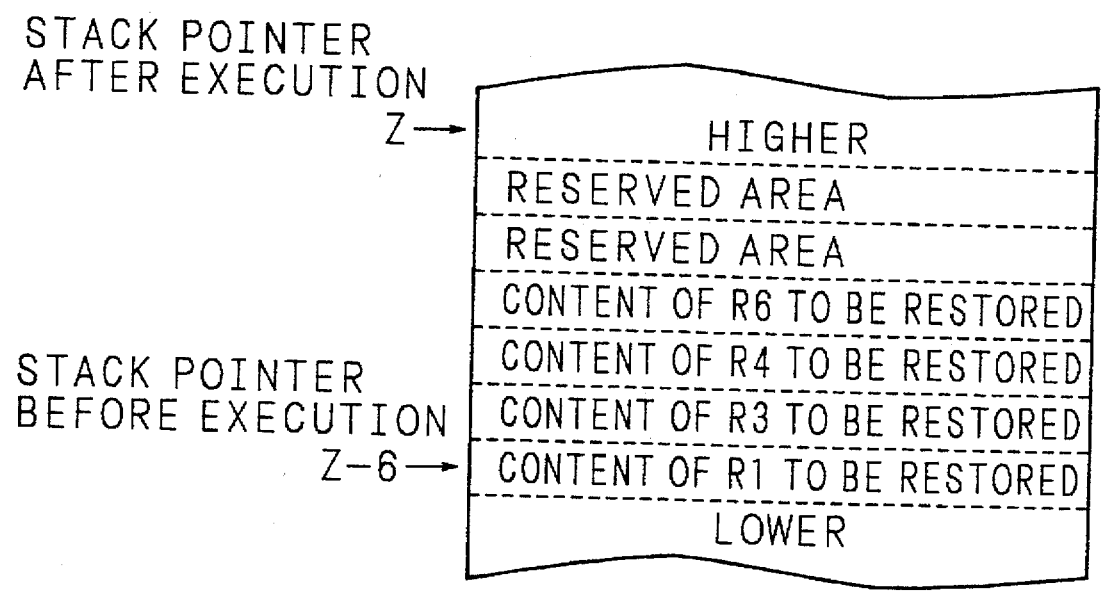
FIG. 14 is a schematic diagram of a memory area showing a context restore area of one embodiment of a central processing unit according to the invention.

Here, it is assumed that the task number, task 2 register list, and task 2 save area size on the context save information table be the same as in case of the aforementioned save instruction. In addition, as shown in FIG. 14, the content of the four registers R1, R3, R4 and R6 is saved in the memory, and the stack pointer before executing the restore instruction points the address at the lower end of the context save area of the address "Z−6".

In the restore instruction, the microprogram shown in FIGS. 13A and 13B is executed, but up to the 8th step, operation is performed in the same way as in case of the save instruction, and therefore, description will be omitted. Description will made on the operation of the 9th step and after.

(Ninth step): The content of the stack pointer 5 pointing the address "Z−6", which is the address at the lower end of the context save area, is written into the memory address register 3.

(Tenth step): In the processing of 7th and 8th steps, the task 2 save information area size has already been read into the memory data register 2 from memory. Consequently, in this step, the value of this memory data register 2 is added to the value of the stack pointer 5. As a result, the value of the stack pointer 5 becomes "Z" which is the sum of "Z–6" and the value "6" as shown in FIG. 14. At the same time, the encode output of the priority encoder 11 is written into the register pointer register 12. At this point, since the output of the register list register 10 is "0101 1010", the priority encoder 11 outputs the encode value "1" ("001" in binary). In addition, the REMZ value indicating whether all of the bits of the register list register 10 are "0" or not is inputted to the microaddress counter 16. When the REMZ is "1", the 13th step microaddress is loaded to the microaddress counter 16. That is, when all of the bits of the register list register 10 is "0", 11th and 12th steps which perform register restore processing are jumped. At this point, since there is a bit which is not "0", the microaddress counter 16 is incremented by "1" and the 11th step is executed.

(Eleventh step): The memory content of the address "Z–6" specified by the memory address register 3 which was written in the 9th step is read and held in the memory data register 2. This corresponds to the content of the restored register R1 shown in FIG. 14. At the same time, the bit of the register list register 10 corresponding to number "1", the number specified by the register pointer register 12 in the 10th step, is cleared. As a result, the content of the register list register 10 changes from "0101 1010 (binary)" to "0101 1000 (binary)". Consequently, the priority encoder 11 outputs "3" ("011" in binary) as an encode value.

(Twelfth step): The restore content of the register R1 which was read to the memory data register 2 in accordance with the number "1" specified by the register pointer register 12 in the 10th step is written into the register R1. At the same time, the value of the memory address counter 3 is incremented by "1" as well as the encode output value "3" of the priority encoder 11 is written into the register pointer register 12. In addition, when the REMZ value of the priority encoder 11 is "0" (when there is a bit which is not "0" in the content of the register list register 10), the 11th step microaddress is loaded to the microaddress counter 15 and the 11th and 12th steps are repeated.

In this embodiment, in the same manner as in case of the aforementioned save instruction, 11th and 12th steps are executed four times repeatedly and the memory address register 3 is incremented by "1" each time.

By the foregoing processing, after 1st to 4th executions of the 11th step, the contents of the register list register 10 and register pointer register 12 and a register to be restored are determined as follows.

First execution
Register list register: 0101 1000
Register pointer register: 1
Register to be restored: R1
Second execution
Register list register: 0101 0000
Register pointer register: 3
Register to be restored: R3
Third execution
Register list register: 0100 0000
Register pointer register: 4
Register to be restored: R4
Fourth execution
Register list register: 0000 0000
Register pointer register: 6
Register to be restored: R6

(Thirteenth step): In 12th or 9th step, when all of the bits of the register list register 10 become "0", the operation code part of the next instruction is fetched to the macro instruction decoder 14 from the instruction queue 13 and execution of the restore instruction is completed.

By the above-mentioned operation of the central processing unit of the present invention, the four contents of task 2 saved in memory as shown in FIG. 14 are restored to registers R1, R3, R4 and R6.

As described in details, according to the central processing unit of the present invention, in accordance with one instruction code, by referring to task information and selecting and loading register select information from context save information, M pieces of registers are selected from N pieces of registers and the task context is transferred between M pieces of registers and memory. Consequently, it becomes possible to save or restore the content of only the register necessary for processing of task switching by one instruction. With this configuration, the capacity occupied by RAM necessary for saving or restoring the context can be reduced as well as saving or restoring processing can be executed at high speed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A central processing unit which restores a context of only one task among the contexts of a plurality of tasks saved in an external memory to the inside and executes instructions based on the restored content, comprising:

a plurality of internal registers for storing the context restored from said external memory;

controlling means for, on the basis of one instruction code, saving the context by selecting one or more internal registers from said plurality of internal registers and transferring the context of one task from said selected registers to said external memory; characterized in that said instruction code has a first address information for indicating an address of said external memory in which a task information specifying the task whose context must be saved is stored, and a second address information for indicating an address of said external memory in which a context save information including a register select information for specifying, for each one of a plurality of tasks, one or a plurality of registers to be saved is stored, and said controlling means includes;
means for reading said task information from said external memory in accordance with said first address information;
means for reading said register select information related to the task whose context must be saved from said external memory in accordance with said second address information and said task information;
means for selecting one or a plurality of registers from said plurality of internal registers in accordance with the read-out register select information; and
means for saving said context to said external memory by transferring the context from said selected registers to said external memory.

2. A central processing unit which restores a context of only one task among the contexts of a plurality of tasks saved in an external memory to the inside and executes instructions based on the restored content, comprising:

a plurality of internal registers for storing the context restored from said external memory;

controlling means for, on the basis of one instruction code, restoring the context by selecting one or more registers from said plurality of internal registers and transferring the context of one task from said external memory to said selected registers; characterized in that said instruction code has a first address information for indicating an address of said external memory in which a task information specifying the task whose context must be restored is stored, and a second address information for indicating an address of said external memory in which a context save information including a register select information for specifying, for each one of a plurality of tasks, one or a plurality of registers to be restored is stored, and said controlling means including:

means for reading said task information from said external memory in accordance with said first address information;

means for reading said register select information related to the task whose context must be restored from said external memory in accordance with said second address information and said task information;

means for selecting one or a plurality of registers from said plurality of internal registers in accordance with the read-out register select information, and means for restoring said context from said external memory by transferring the context from said external memory to said selected registers.

3. A central processing unit which restores a context of only one task among the contexts of a plurality of tasks saved in an external memory to the inside and executes instructions based on the restored content, comprising:

a plurality of internal registers for storing the context restored from said external memory;

controlling means for, on the basis of one instruction code, saving or restoring the context by selecting one or more registers from said plurality of internal registers and transferring the context of one task between said selected registers and said external memory; characterized in that said instruction code has a first address information for indicating an address of said external memory in which a task information specifying the task whose context must be saved or restored is stored, and a second address information for indicating an address of said external memory in which a context save information including a register select information for specifying, for each one of a plurality of tasks, one or a plurality of registers to be saved or restored is stored, and said controlling means including:

means for reading said task information from said external memory in accordance with said first address information;

means for reading said register select information related to the task whose context must be saved or restored from said external memory in accordance with said second address information and said task information;

means for selecting one or a plurality of internal registers from said plurality of internal registers in accordance with the read-out register select information; and means for saving or restoring said context to or from said external memory by transferring the context between said selected registers and said external memory.

* * * * *